June 5, 1956 C. W. SOULE 2,749,065
SAFETY SEAT LOWERING DEVICE FOR AIRCRAFT PASSENGER
Filed Dec. 30, 1953 3 Sheets-Sheet 1
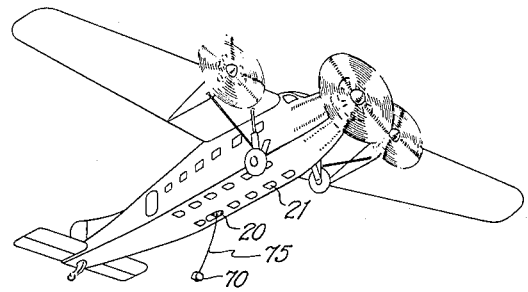
FIG. 1.
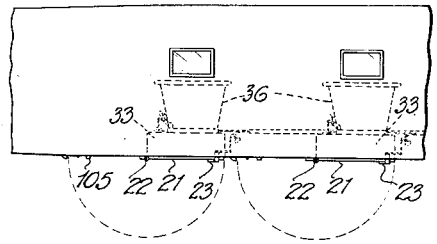
FIG. 2.
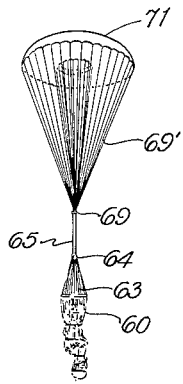
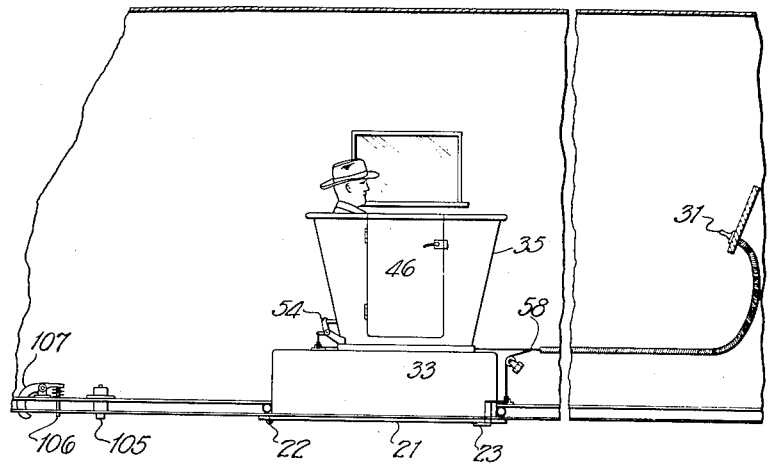
FIG. 3.
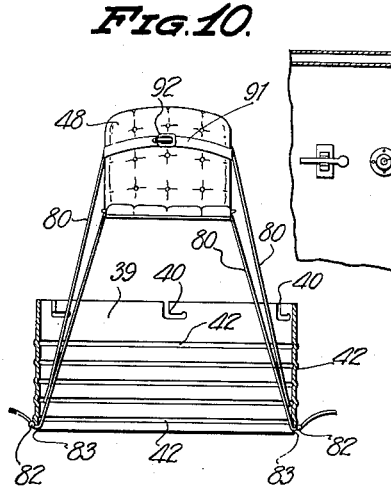
FIG. 10.
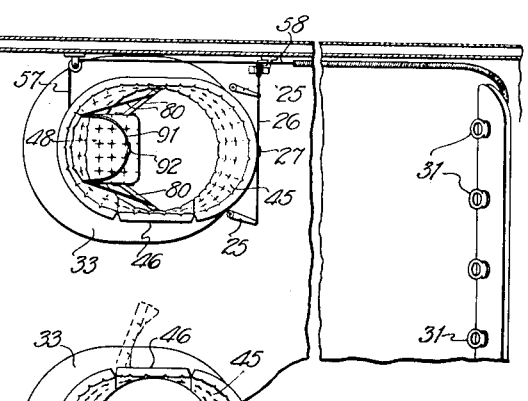
FIG. 4.
INVENTOR
CHARLES W. SOULE.
BY
Ely Pattison
ATTORNEYS
WITNESS:

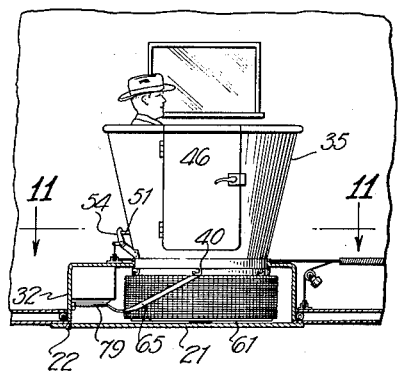
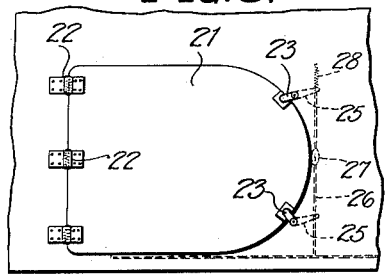
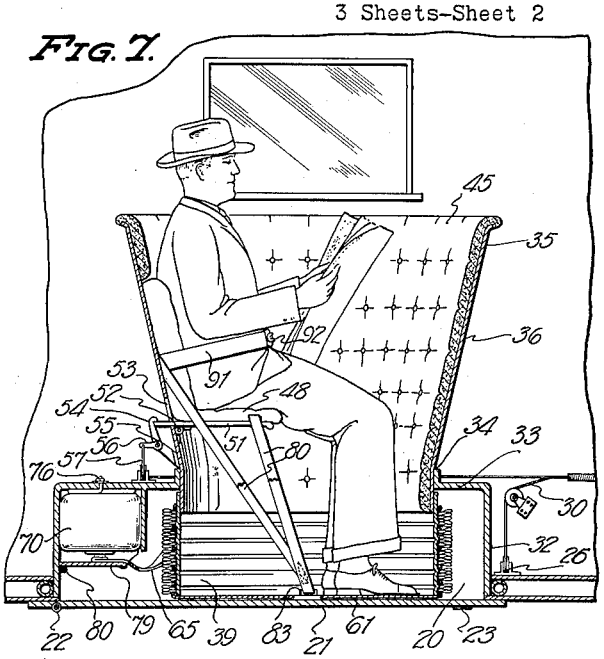
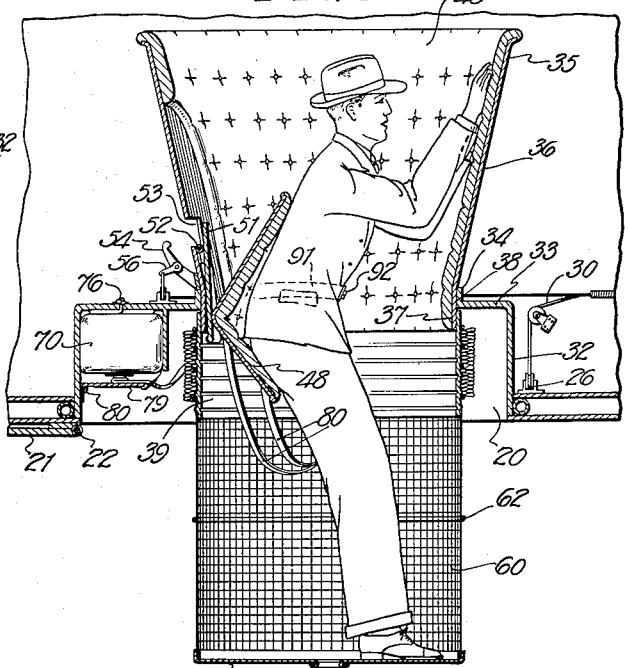
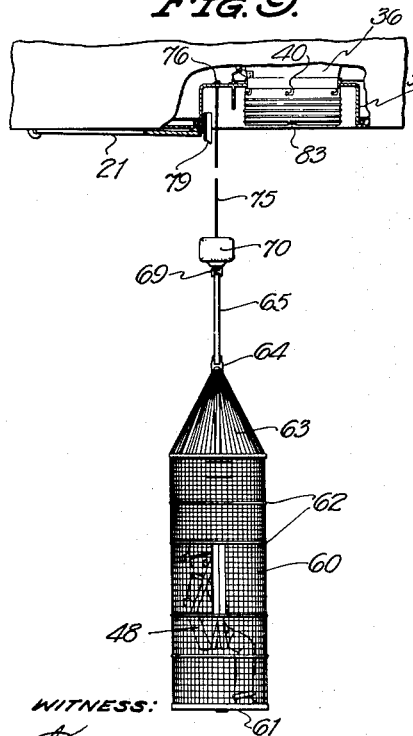

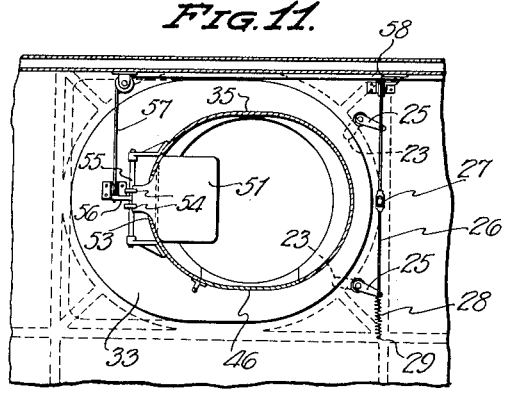

United States Patent Office 2,749,065
Patented June 5, 1956

2,749,065
SAFETY SEAT LOWERING DEVICE FOR AIRCRAFT PASSENGER

Charles W. Soule, Washington, D. C.

Application December 30, 1953, Serial No. 406,172

(Filed under Rule 47(b) and 35 U. S. C. 118)

6 Claims. (Cl. 244—141)

This invention relates to airplanes, and more particularly it pertains to improvements in safety devices therefor.

It is the object of the invention to provide a new and novel construction whereby one or more passengers may be released from an airplane in flight and be safely delivered to the ground, even without the necessity of skill on the part of the passenger.

A feature of the invention resides in a novel construction whereby a number of passengers may be discharged or released from an airplane in flight, singly and selectively at the will of the pilot or other attendant of the machine.

Another feature of the invention resides in a novel construction and arrangement of parts whereby one or more passengers may be discharged from an airplane in a manner over which the passenger being discharged has no control.

Still another feature of the invention resides in a novel construction whereby each person discharged from an airplane will be equipped with a parachute when the person is discharged, although the parachute is never in evidence upon the interior of the airplane.

Still another feature of the invention resides in a novel construction whereby the parachute with which each person is equipped will not open until such time as the person is free of the airplane, a sufficient distance to prevent fouling or entanglement of the parachute with the airplane.

Still a further feature of the invention resides in a novel construction whereby the discharge of the passengers is wholly under the control of the pilot or other attendant of the airplane, and wholly out of the control of the passenger or passengers thereof.

Other features of the invention relate to certain novel and improved constructions, arrangements and combinations of parts hereinafter described and particularly pointed out in the claims, the advantages of which will be readily understood and appreciated by those skilled in the art to which the invention pertains.

The invention will be clearly understood from the accompanying drawings illustrating the invention in its preferred form and the following detailed description of the construction therein shown.

In the drawings:

Figure 1 is a perspective view of an airplane constructed in accordance with the present invention.

Figure 2 is a fragmentary view in elevation of a portion of an airplane constructed in accordance with the present invention.

Figure 3 is a fragmentary longitudinal sectional view, partly broken away, showing the interior of an airplane body constructed in accordance with the present invention.

Figure 4 is a fragmentary horizontal sectional view showing the interior of an airplane body constructed in accordance with the present invention.

Figure 5 is a fragmentary view, partly in section and partly in elevation, of a portion of an airplane constructed in accordance with the present invention.

Figure 6 is a fragmentary bottom plan view of a portion of the body of an airplane constructed in accordance with the present invention.

Figure 7 is a detail vertical sectional view on an enlarged scale, showing a passenger in position under normal conditions.

Figure 8 is a similar view showing the passenger being discharged from the airplane.

Figure 9 is a fragmentary view, partly in section and partly in elevation, showing a passenger discharged from the airplane, but before the parachute has opened.

Figure 10 is a detail view, partly in elevation and partly in section, illustrating a portion of the harness employed.

Figure 11 is a horizontal sectional view taken on the line 11—11 of Figure 5.

Figure 12 is a detail fragmentary plan view.

Figure 13 is a detail sectional view, illustrating the manner in which the parachute is packed and stored.

Figure 14 is a view in elevation illustrating on an enlarged scale that portion of the device in which the passenger is carried when he is discharged from the chute, and Figure 15 is a top plan view of that portion of the device illustrated in Figure 14, the shroud lines being removed.

In the present illustration of the invention, it is shown as embodied in a twelve passenger airplane, but it is to be understood that the invention is not limited to use with an airplane of any particular passenger capacity and that it may be embodied in an airplane of the single passenger type if desired.

Referring to Figure 1 of the drawings, it will be apparent that an airplane constructed in accordance with the present invention will have, in the bottom wall of the body, a plurality of openings 20, each of which is closed by a swinging or hinged door 21, mounted for swinging movement upon hinges 22. These doors 21 are so arranged that they swing to open position by gravity and when moving to open position, move in a direction from front to rear of the airplane. Releasable means is provided to hold each of these doors 21 normally in its closed position, and in the present embodiment of the invention, this means consists of lugs 23, which engage the door as best shown in Figure 6. Each locking lug is operated by a crank 25, which cranks are connected by a transversely extending cord or cable 26, between the ends of which there is a suitable adjusting device such as a turnbuckle 27. One end of the cord or cable is connected to a spring 28 which in turn is connected as at 29 to the body of the airplane, and these several parts are so constructed and arranged that the spring 28 tends normally to hold the locking lugs in position to secure the door closed. The cord or cable 26 is suitably connected to a pull cord 30 having a pull handle 31, see Figure 3, which handle is located at a point closely adjacent the pilot's station. It is to be understood that a mechanism as just described is provided for each opening in the bottom wall of the body of the airplane, and, therefore, the several swinging doors may be singly and selectively operated.

Associated with each opening, there is a passenger confining compartment, and inasmuch as each of these passenger confining compartments are of the same construction, it will suffice to describe the construction and operation of but one.

The construction and operation of the passenger compartments are best shown in Figures 7 and 8, and in describing these compartments, reference will be had mainly to said figures.

Mounted in the opening 20, there is a housing 32 which extends upwardly into the body of the airplane, as at 33, and the top wall of the housing 32 has an opening 34 therein. The passenger confining compartment preferably consists of a substantially cylindrical member 35 having outwardly flared side walls 36, its lower end being defined by a flange 37, preferably circular in form. The opening 34 in the top wall 33 of the housing 32 is defined by a flange 38, and the cylindrical portion 37 of the passenger confining compartment is, as shown, adapted to be received in this opening 34. The passenger confining compartment is lined with suitable upholstery 45, and is provided with a door 46, by means of which ingress and egress to and from the compartment may be had. The upholstery 45 is preferably cut away, as at 47, to receive a seat 48 which, however, is not a fixed part of the passenger confining compartment but is, instead, preferably carried by the passenger to whom it may be secured by a suitable harness 50, to be hereinafter more specifically described.

The seat 48, when the passenger is in the passenger confining compartment, is adapted to rest upon a suitable seat supporting member 51. This seat supporting member 51 is in the form of a hinged shelf pivotally mounted upon the side walls of the passenger confining compartment by one or more hinges 52. A portion of the seat support projects through an opening 53 in the side wall of the passenger confining compartment and is adapted to be engaged by a pivoted holding latch 54 which is pivotally mounted as at 55 and has an arm extension 56. Connected to the extended arm 56 is a cord or cable 57 and, as best illustrated in Figure 11, this cord or cable 57 is attached to the pull cord or cable 30, heretofore mentioned, as at 58. By this means, when a pull cord 30 is operated to release the swinging door as heretofore described, the holding latch of the corresponding seat support will be moved to releasing position, whereupon the seat supporting member will, under the weight of the passenger, move to the position in which it is shown in Figure 8 to discharge the seat and passenger therefrom.

Carried by the lower end of the passenger confining compartment, there is a circular sleeve-like member 39. This member 39, is best illustrated in Figure 10, and as illustrated in said figure, it is provided in its upper edge with a plurality of bayonet slots 40 which are adapted to receive pins projecting from the outer face of lower end of the passenger confining compartment. By this means, the cylindrical sleeve-like member 39 may be removably attached to the lower end of the passenger confining compartment. Extending circumferentially of the member 39, there are a plurality of outwardly projecting ribs 42, preferably arranged in spaced parallel relation, the purpose of which will be hereinafter more specifically described.

The reference character 60 designates what I term a passenger receiving member and the passenger is, when the seat collapses as heretofore described, projected thereinto from the passenger confining compartment 35. This passenger receiving member consists of an elongated bag-like member preferably cylindrical in form and constructed with open net work sides with a bottom 61 of canvas or other suitable material. This device is constructed in a manner to be collapsible and although it is not herein illustrated except vaguely in Figure 1, it is adapted to collapse about the body of the passenger when he is discharged from the airplane. Encircling the body portion of the passenger receiving member 60, and arranged in spaced relation to each other, there are a plurality of contracting bands 62, preferably formed from rubber or other suitable elastic material, and these bands 62 perform two functions as follows. First, they serve to releasably hold the passenger receiving member 60 in position upon the member 39 when the apparatus is positioned in the airplane for use, the passenger receiving member 60 being gathered over the said member 39, as best illustrated in Figure 7, with the bands 62 engaged above the ribs or beads 42. By this arrangement, when the passenger is projected from the seat as shown in Figure 8, and discharged into the passenger receiving member 60, the same will, under the weight of the passenger, be stripped from the member 39 and be disengaged from the airplane. Secondly, the bands 62 serve, as the passenger receiving member passes free of the member 39, to contract the passenger receiving member closely around the body of the passenger as described.

Extending from the upper end of the passenger receiving member 60, there are a plurality of shroud lines 63 which are connected by means of suitable fittings 64 to two suitable supporting straps, ropes or cables 65. These straps 65 are connected to a fitting 69 which, in turn, is attached to the shroud lines 69' of the parachute hereinafter described.

By reference to Figure 13, the parachute pack will be seen to consist of a bag 70, within which in suitably folded form, a parachute 71 is stored. The fitting 69, heretofore mentioned, is connected to the shroud lines 69' of the parachute and these shroud lines lie in an opening 73 in the bag 70. This opening 73 is so constructed as to be capable of expansion to an extent which will permit of the parachute being pulled from the bag when strain is placed upon the strap or cord 65. Extending from the opposite side of the bag 70, there is a cord 75 which, as best shown in Figures 7 and 8, is attached to the top wall of the compartment 33, as at 76.

The chute pack, illustrated in Figure 13, is supported as shown in Figures 7 and 8 in the compartment 33 by means of a shelf 79, mounted by means of spring hinges 80, to one side of the compartment 33. Thus, as the strain comes upon the parachute pack, the same will be pulled from the compartment 33 by reason of the folding down of the hinged shelf 79, and pass from the airplane as shown in Figure 9.

As best shown in Figure 15, the two straps 65, which constitute the harness heretofore mentioned, extend through slots or openings in the fittings 64, and each strap terminates in two members 80, one of which is connected to the seat bottom 48, the other being connected to the back of the seat 48. This construction is best illustrated in Figures 7 and 10. Each of these straps is provided with a cross pin 82 which is adapted to engage the outer wall of the member 39 with the straps 80 lying in recesses or notches 83 in the bottom edge of the member 39. This engagement of the pins 82 with the bottom edge of the member 39 places the members 80 under tension to hold the seat 48 upon the seat supporting shelf 51, although they do not serve to secure the seat to said shelf. The harness also includes a belt 91 which is secured to the seat, preferably the back thereof, and this belt passes around the body of the passenger and is secured by the buckle 92.

The device operates in the following manner:

In Figure 7, the parts are shown in their operative position under normal flying conditions. If, with the parts in the position in which they are shown in Figure 7, it is desired to release or discharge a passenger, the pilot or other attendant grasps the proper hand grip 31 and exerts a pull upon the corresponding cord or cable 30. When pulled, the cord or cable 30 will operate the holding lugs 23 to release the door 21 and permit it to swing about its hinges 22 when the passenger is projected thereon. Simultaneously with the release of the door holding lugs 23, the latch 54 is operated to release the seat shelf 51, and thereby permit operation of the seat to discharge the passenger thereon.

As the door 21 is released and swings rearwardly, it engages a buffer 150, see Figure 3, and also a pin 106. The pin 106 serves, when struck by the door 21, to release a hook 107 which engages beneath the door and holds the same in its open position, thereby preventing swinging thereof and all possibility of its interfering with the proper discharge of the passenger.

The door having moved to its open position all support of the passenger receiving member is removed, and when the passenger is delivering thereto, the same will be stripped from the member 39 by the passenger, as illustrated in Figure 8.

When the passenger receiving member has been stripped from the member 39 and discharged from the airplane, the cords or cables 65 and 75 become taut, whereupon the parachute pack is pulled from its compartment, as illustrated in Figure 9, after which the parachute is stripped from its casing, as heretofore described.

As the seat 48 and its passenger descend into the passenger receiving member 60, the straps 80 swing above the seat, as clearly shown in Figure 14.

The top of the bag is adapted to be closed due to the shroud lines 63 being equally divided and the free ends fixedly secured to the fittings 64, shown clearly in Figure 15. The straps 80 terminate in a single strap at the pin 82 on both sides of the seat. These straps are attached above the fittings 64 to straps fixed to the fittings 64. The straps are then crossed and slidable through apertures of the opposite fitting, as clearly shown in Figure 15. The free ends of the straps 65, after passing through fittings 64, are attached to the fittings 69 which carry the shroud lines 69' of the parachute 71.

As the weight of the passenger on the seat 48 pulls downwardly on the straps 80, and the upward pull on the fitting 69 by the parachute 71, the straps 65 act as a pull string by sliding through the apertures in the opposite fittings, the fittings 64 will be brought together to close the top of the bag by the shroud line 63. The proper length of the straps 65 determines the position of the seat and support it within the bag-like member.

The passenger and parachute having been released from the airplane, the parachute unfurls as illustrated in Figure 1, and the passenger will be landed in safety without any effort on his part, and by an apparatus wholly beyond his control.

While the invention has been herein illustrated in its preferred form, it is to be understood that it is not to be limited to the construction and arrangement specifically shown herein, and that it may be carried out in other forms which rightfully fall within the scope of the appended claims.

I claim:

1. In an airplane, a seat, a passenger confining compartment having side walls and surrounding the seat, a hinged bottom wall for said compartment, said bottom wall tending normally to swing to position to open the bottom of the passenger confining compartment to project a passenger therethrough, releasable means for holding the bottom wall of the passenger confining compartment in closed position, a collapsible passenger receiving bag-like member releasably carried by the side walls of the passenger confining compartment and readily removable therefrom by the weight of a passenger projected through the open bottom wall of the passenger confining compartment, means for releasing said seat to project a passenger through the bottom of the passenger confining compartment, and safety lowering means attached to said passenger receiving member.

2. In an airplane, a seat, a passenger confining compartment having side walls and surrounding said seat, a hinged bottom wall for said compartment, said bottom wall tending normally to swing to position to open the bottom of the passenger confining compartment to project a passenger therethrough, releasable means for holding the bottom wall of the passenger confining compartment in closed position, a collapsible passenger receiving bag-like member releasably carried by the side walls of the passenger confining compartment and readily removable therefrom by the weight of a passenger projected through the open bottom wall of the passenger confining compartment, means for simultaneously releasing the bottom wall of the passenger confining compartment and said seat to project a passenger from the passenger confining compartment into the passenger receiving member, safety lowering means attached to said passenger receiving member.

3. In an airplane, a collapsible seat, a passenger confining compartment surrounding said seat and having side walls and an open bottom, a passenger receiving member carried by the side walls of the passenger confining compartment and closing the open bottom of the passenger confining compartment, safety lowering means attached to said passenger receiving member, releasable means supporting said passenger receiving member in position upon the side walls of the passenger confining compartment, and means whereby the supporting means of the passenger receiving member and a passenger in the passenger confining compartment may be simultaneously released to project a passenger within the passenger receiving compartment into the passenger receiving member and to strip the passenger receiving member from the side walls of the passenger confining compartment, said releasing means including said seat.

4. In an airplane, a collapsible seat, a passenger confining compartment having side walls and an open lower end, a swinging door forming a bottom for said open end, a collapsible passenger receiving member carried by the side walls of the passenger confining compartment and supported on said swinging door, safety lowering means attached to said passenger receiving member, and means for releasing said hinged door and for simultaneously discharging a passenger from the passenger confining compartment into the collapsible passenger receiving member thereby to strip the passenger receiving member from the side walls of the passenger confining compartment and clear of the airplane, said releasing means including said collapsible seat.

5. In an airplane, the combination with the fuselage, of a safety device including a passenger confining compartment having side walls presenting a lower portion all within the fuselage, a collapsible seat located medially of the compartment, a hinged bottom wall for said passenger confining compartment, said hinged bottom wall being constructed and arranged to move when released to position to open the lower portion of the passenger confining compartment, means for holding such hinged bottom wall in its closed position, means for releasing said bottom wall, a passenger receiving member carried by the outer face of said lower portion of the side walls of the passenger confining compartment and in normally collapsible condition, said member being adapted to be stripped from the outer face of said lower portion when the collapsible seat and hinged bottom wall of the passenger confining compartment are released, and safety lowering means attached to said passenger receiving member.

6. In an airplane, the combination according to claim 5, wherein, the lower portion of the passenger confining compartment is tubular, and the passenger receiving member is in the form of a bag-like network with a plurality of contractile bands which normally embrace the lower portion of the passenger receiving member to hold the bag-like network in an inoperative position.

References Cited in the file of this patent

UNITED STATES PATENTS

| 1,814,325 | Miyasaki | July 14, 1931 |

FOREIGN PATENTS

| 201,642 | Great Britain | Aug. 3, 1923 |
| 432,134 | Germany | July 23, 1926 |
| 581,485 | France | Sept. 29, 1924 |